July 26, 1955  R. C. SCHENCK  2,713,987
VALVE FOR CORROSIVE FLUIDS
Filed Feb. 28, 1950
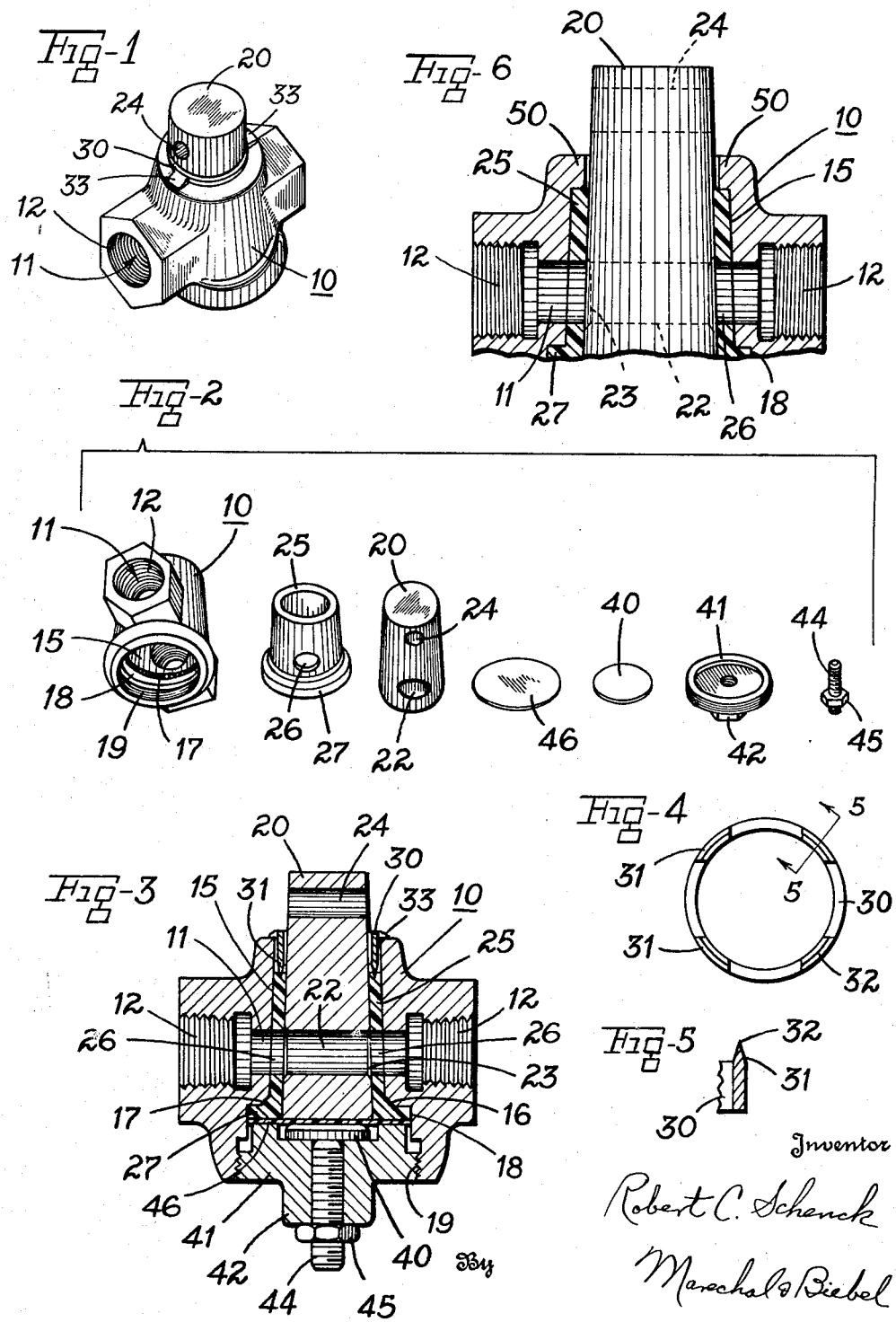

United States Patent Office 2,713,987
Patented July 26, 1955

2,713,987

VALVE FOR CORROSIVE FLUIDS

Robert C. Schenck, Dayton, Ohio, assignor to The Duriron Company, Inc., Dayton, Ohio, a corporation of New York Application February 28, 1950, Serial No. 146,645

3 Claims. (Cl. 251—188)

This invention relates to plug valves and more particularly to such valves which do not require external lubrication and which are suitable for both general and for corrosion resisting applications.

Plug valves have certain advantages for control of the flow of fluids, particularly corrosive fluids and solvents, over either gate or globe valves. Thus in the gate valve, the surface of the gate as well as the surface of the seat which forms the seal are exposed to the flow the entire time the valve is open, and hence these surfaces are subject to continuing wear, abrasion and corrosive action as well as tending to be a depository of solids, crystals, heavy gums or adhesives depending upon the nature of the fluid forming the flow. The globe valve has similar inherent objections and in addition requires an abrupt change in the direction of flow, thus creating increasing flow resistance over the straight through flow which is obtained with a plug valve.

While the plug valve may expose a part of its seal-forming surface to the flow depending upon the extent to which it is opened, it does not expose the entire surface, and when in full open position practically the entire seal-forming surface is enclosed and protected against the flow. The plug valve is therefore desirable for such purposes but it has usually been found necessary to provide some means to facilitate its turning since it has a substantial area of contact, and where used to handle corrosive fluids sufficient corrosion may occur as to make it difficult or impossible to turn the valve by ordinary means. It is necessary that the plug be made to fit closely in the valve body in order to provide for a completely sealed condition both with respect to shutting off the flow and with respect to outside leakage, such positive control and maintenance of an effectively sealed condition being of even more than ordinary importance where the fluid being handled is dangerously corrosive. Such close fit however increases the tendency of the metal parts to bind or gall, such tendency being especially likely to occur with some of the metal compositions which are highly corrosion resistant.

Lubrication of the entire plug in the valve body facilitates the freedom of turning but for many purposes is undesirable because of the exposure of the lubricated surface to the flow, and the consequent contamination of the flow by the lubricant and the undesirable effect of flow upon the lubricant. Other expedients may be resorted to such as the lifting up of the plug and the turning thereof to a new position before it is returned to its flow controlling position but such mechanical shifting of the plug is likewise undesirable and does not make for the most convenient and economical construction and operation. Furthermore such valve constructions have usually required a stuffing box, packing, or the like.

In accordance with the present invention a plug valve is provided which while suitable for ordinary use is particularly adapted for corrosion and solvent resisting purposes and which has free turning properties in the absence of lubricant. It embodies the advantages of direct through, low resistance flow and freedom from complete or continuous exposure of its seal-forming surfaces to the flow. It is simple and economical in manufacture and in use may be simply turned to any desired flow controlling position without the need to bodily lift and reseat the plug. It is free of objectionable binding or galling even when operating under high pressures and regardless of the nature of the metal so that any corrosion resistant or other metal composition may be used as desired, and at all times it establishes a highly effective seal both within the parts of the valve itself and with respect to the control of the flow through the valve. Further the valve remains effective throughout extended use and embodies parts which may be removed and replaced to provide additional useful life.

It is accordingly the principal object of the present invention to provide such a plug valve having free turning properties in the absence of lubricant, which is simple and satisfactory in manufacture and use, and which has a long useful life during which it remains free turning and affords positive control of the flow without leakage at all times.

It is a further object to provide such a valve having a liner of plastic material forming the seal which may be assembled with a press fit, is capable of cold flow under pressure so that it may be shaped by pressure to conform accurately to the surfaces of the plug and the body, and which has self-lubricating characteristics facilitating the maintenance of the plug in sealed relation at all times without the use of packing glands, stuffing boxes, or the like, while enabling it to be turned with a minimum of force.

It is also an object to provide such a valve in which the liner may be readily removed and replaced and to provide such a valve in which the plugs may be replaced without special fitting, to provide extended useful life for the valve.

Other objects and advantages will be apparent from the following description, the accompanying drawings and the appended claims.

In the drawings,

Fig. 1 is a view in perspective of a plug valve constructed in accordance with the present invention;

Fig. 2 is a view in perspective of the valve with its several parts separated and shown in exploded relation to each other;

Fig. 3 is a vertical sectional view showing the construction of the valve;

Fig. 4 is an end elevational view of the retaining ring structure;

Fig. 5 is a broken detail view on the line 5—5 of Fig. 4; and

Fig. 6 is a partial view of a modified construction.

Referring to the drawings which disclose a preferred embodiment of the invention, the valve body is indicated generally at 10 and is provided with flow passages 11 extending therethrough, such passages being suitably threaded or flanged at either end as shown at 12. It will be understood that the body may have different shapes and sizes as desired for the particular purpose for which the valve is to be used, and that connecting means other than the threaded portions 12 may be provided if desired. The particular choice of material for the body depends upon the nature of the use and the fluid with which the valve is to be used. Where corrosion resistance is desired the body is made of suitable corrosion resisting material such as one of the stainless steel alloys, nickel, monel, nickel cast iron, high silicon iron or other corrosion resisting materials, the characteristic of certain of such metals being that they are relatively hard and difficult to machine and in some cases have bad galling or seizing tendencies. The valve body is preferably first cast and may then be subjected to additional finishing operations by machining, boring and grinding, or the like.

Extending transversely to the flow passage 11 there is a bore 15 which is suitably tapered as shown in Fig. 3. On the lower side of the flow passage the bore has a beveled portion 16 which may be suitably knurled as shown at 17 to engage and grip the correspondingly beveled portion of the liner, and which extends to an offset 18. This offset portion may also be formed to engage and prevent turning of the liner, such as having a non-circular shape, for instance a flat sided polygonal surface. The outer wall of the body is internally threaded as shown at 19.

A tapered plug 20 which may be of the same material as the body is provided, the plug having a through port 22 of approximately the same diameter as flow passage 11 and with its outer periphery chamfered as shown at 23 to prevent damage to the liner. The port 22 extends through the plug relatively closer to the large diameter end than to the small diameter end thereof and in its assembled relation the large diameter end is enclosed within the body while the small diameter end projects beyond the body without interruption in the conical surface. An additional bore 24 may be provided through the projecting end of the plug, and preferably in a parallel plane with port 22, providing for receiving an operating pin in order to turn the valve, the pin thus also serving as an indicator of the valve position.

As so constructed the plug is formed with a tapered or frusto-conical surface which extends continuously and without offset from one end of the plug to the other. Thus there are no shouldered areas which require separate finishing, and the entire tapered surface of the plug can be readily finished by grinding or the like in a simple and economical manner. Likewise the chamfering operation may be performed upon the external surface of the ends of the port 22 and this also represents a relatively simple finishing operation.

A liner 25 is positioned within the tapered bore 15 of the body, the liner being tapered inside and out correspondingly to the tapers of the plug and bore respectively and having transversely aligned openings 26 therein which are adapted to match the adjacent ends of the flow passage 11, forming in effect continuations thereof. The liner is formed with an outwardly extending flanged portion 27 which seats within the offset 18 and against the gripping surface of knurled portion 17 when the liner is in assembled position. Preferably the liner is so formed that it has an outside diameter slightly greater than the inside diameter of the bore 15 at each corresponding section, such as from about 0.005 inch to .035 inch or even more, so that the liner may be press fitted into position by pressure applied to the flanged end thereof and will be caused to securely seat itself in position, from which however it can be removed if desired for replacement.

A liner retaining ring 30 is shown in position on the upper side of the flow passage and is formed with a series of downwardly projecting arcuate teeth 31 four of which appear in Fig. 4. These teeth have sharp edges 32 as indicated in Fig. 5 and the ring is received in the bore 15 of the body and may be suitably secured in place by welding 33 to the body. The ring is of such length that the inwardly projecting teeth 31 will extend into the end of and firmly secure the liner 25 against rotation. In this connection, cross-reference is made to my copending application Serial No. 176,600, filed July 29, 1950, which is assigned to the same assignee as this application, and which discloses in more detail interlocking retaining means for the ends of the liners in a corrosion resisting valve.

The liner is selected to have the desired properties of substantially complete inertness in the presence of the fluid to be handled, and hence is itself highly resistant to such fluid. In addition it is desirable that it have self-lubricating properties such that it takes the place of and overcomes the need for the supply of lubricant heretofore used in valves of this nature, and that it be deformable under pressure or have cold flow properties such that it can be caused to seat closely and accurately when in operative position. It is important that the liner material be such that throughout its area of contact with the tapered surface of the plug and body an effective sealed condition will be established and maintained, preventing leaking both circumferentially and axially of the plug, while at the same time avoiding the development of such frictional resistance as to make the turning of the plug unduly difficult.

A material which has been found highly satisfactory for this purpose is a plastic resinous material having such corrosion resistance and self-lubricating properties in the absence of a film of lubricant. Satisfactory results have been obtained with a polyethylene resin material, particularly the halogen substitution products thereof. In this group are included polyethylene itself, and $C_2Cl_4$, $C_2ClF_3$ and $C_2F_4$. The latter product, namely polytetrafluoroethylene and its interpolymers and copolymers is commercially available under the name of Teflon, and has been found especially desirable for use in accordance with the present invention, having the combination of the desired characteristics, namely, complete inertness in the presence of corrosive fluids including solvents, good self-lubricating properties, low frictional drag in contact with the corrosion resistant metals, toughness and resistance to physical wear, abrasion and the like, usable over a wide temperature range, and ability to be worked and capable of cold flow under pressure in order to establish highly effective sealing conditions.

The liner 25 is suitably formed of such plastic material by preforming under pressure in a mold, and subsequently heating to complete the processing and producing a liner of the approximate size and shape for being received in the bore of the body. Pressure is then applied to the flanged end of the liner to press it into the body thus pressing the flange 27 into the offset 18 and the knurled portion 17 of bevel 16. The plug 20 is then inserted and pressure applied thereto forcing it into the liner to its proper position where the ports are substantially in alignment. This requires substantial pressure and because of the relatively small taper develops a considerable pressure upon the liner itself. The application of pressure to such plastic liner as above described is such as to result in a limited amount of cold flow thereof, producing a deformation of the liner material to such an extent as to cause it to accurately shape itself to the bore in the body, and to develop a smooth tapered surface which establishes a sealing relationship with the surface of the plug on both the larger and smaller diameter sides of the flow passage and port. The Teflon material described above begins to cold flow in the range of pressures of about 1200 to 1500 pounds per square inch, having a retained deformation of approximately 4 to 8% at a pressure of 1200 pounds per square inch, and with the percentage of deformation increasing up to a substantially continuous flow condition at pressures above about 1500 pounds per square inch. If however it is desired to avoid or reduce this flow condition at pressures in a higher range, this may be done by the incorporation of inert fillers with the resin. The retaining ring 30 at the small diameter end of the liner assures that it will remain confined and not flow outwardly beyond the bore itself and the construction and size of the offset portion 18 of the body are preferably such that the flange 27 of the liner completely fills the same and thus is similarly confined at its opposite end.

In order to provide for developing and maintaining the desired pressure sealing contact between the plug and the liner, a thrust disk 40 is mounted inwardly of cap 41 which is threadedly received in the portion 19 of the valve body. The cap may be suitably shaped such as with a hexagonal head 42 by means of which the cap may be securely held in place during use. Pressure is applied to the thrust disk 40 by means of set screw 44 held in place in the cap by lock nut 45, and accessible from the outside of the valve.

It is important to provide for transmission of the thrust to the plug in a manner which will maintain the desired sealed condition and at the same time avoid excessive friction which would otherwise make it difficult to turn the valve from one setting to another. This is accomplished in a highly satisfactory and economical manner in the present invention through the use of a thrust diaphragm 46 which is preferably of the same or similar antifriction plastic material with the liner, and hence has free turning properties and low frictional resistance in the absence of lubricant. As shown, the thrust diaphragm 46 is of a size sufficient to extend into overlapping contact with the flange or shouldered portion 27 of the liner and hence may be securely held in position upon the tightening of the cap 41 in place thereagainst. The presence of this diaphragm thus additionally assures that there will be no leakage into the threaded portion of the cap, either upon the threads 19 or into the threads of the set screw 44, at any time during use or during preliminary assembly and before full sealing pressure upon the plug is established. With the cap 41 tightened in place against the diaphragm and the end of the liner, set screw 44 may then be adjusted to apply axial pressure to the plug, such pressure being applied through the thrust diaphragm 46, thereby maintaining continuous pressure upon the plug to establish and maintain its close sealing engagement with the liner, while at the same time allowing the plug to be turned without excessive friction upon either its side or end walls.

The valve may alternatively be asembled by placing the plug within the liner and chilling the assembly to a low temperature such as by the use of Dry Ice or the like. This causes shrinkage of the liner and the plug so that they can be easily positioned within the body without the necessity for applying any substantial pressure, and in many cases may be merely positioned by hand. The cap 41 and the thrust disk 46 may be then assembled on the valve body in the manner described above, and upon the warming up of the valve, the effect of expansion will develop the desired pressure and cause such cold flow as may be required to form the highly effective sealing surfaces. In this way the valve may be assembled and the necessary sealing both circumferentially and axially of the liner accomplished without the necessity for application of external pressure.

The angle of taper of the bore in the valve body, of the liner and of the plug is preferably the same and is made relatively small, such as not in excess of 3° on a side and preferably as low as 2° on a side for valves of a size below 1 inch and up to about 4° for larger sizes. This taper is substantially less than that usable heretofore with tapered plug valves because it is within the range of Morse tapers and the like where a gripping and non-rotating action is developed. This makes it possible to develop and maintain a high sealing pressure between the plug and the surface of the liner which it contacts without excessive pressure from the set screw 44. Because of the characteristics of the liner, even under such high pressure (which may be of the order of those initially used to bring about the cold flow of the material of the liner) the plug remains free turning in the absence of lubricant, and there is no objectionable binding, galling, or sticking while a completely sealed condition is effectively maintained.

It will be evident from the above that no packing gland, stuffing box or the like is utilized, the extended overlapping areas of the liner and the plug on both sides of the port serving to completely seal the plug and prevent escape of fluid whatever flow controlling position the plug may occupy in the body.

With this construction of valve it will be evident that no lubricant is utilized and hence there is no contamination of the flow regardless of the area of the plug which is exposed to the flow. Furthermore the liner material is so highly inert both chemically and physically that it is not affected by corrosives or solvents. The greater part of the surface which forms the seal for the flow is always enclosed, and when the valve is in the full open position there is practically no exposure of the seal-forming surfaces and hence corrosion, abrasion or other damage to such seal-forming surfaces is reduced to a minimum.

The valve may be easily adjusted by applying additional pressure through set screw 44 to the plug during use in order to maintain a closely sealed condition throughout, and pressure may be developed in that way sufficient to cause actual displacement or localized cold flow of the material of the liner as may be necessary in order to assure the most accurate engagement and relation of the seal-forming surfaces. Also the valve is readily adapted for replacement of the liner, as well as the plug, when that becomes necessary, by the unscrewing of the cap 41 and the removal of the old liner and the substitution of a new liner. Physical damage to the liner from the turning of the plug is at all times minimized by reason of the chamfered surface 23 at the ports which avoids objectionable scoring or cutting of the material of the liner immediately in the path of the moving ports.

In instances where the tendency for the liner to rotate in the body is reduced, such for example as with smaller sized valves, the form shown in Fig. 6 has been found satisfactory, the construction being similar to that already described except with regard to the absence of the toothed ring 30 previously described. In place thereof the body 10 of the valve is merely flanged as shown at 50 above the liner in order to confine it in place but without the use of the teeth which engage therein, the shoulder preventing outward flow of the material of the liner under pressure. Similarly the knurling or polygonal shape of the portion receiving the liner flange may be used as found necessary or desirable. Likewise where ready removability of the liner is not necessary the liner may be secured in place in whole or in part by the application thereto of a suitable adhesive or cement.

The present invention therefore provides a plug valve which may be used for corrosion and solvent resisting purposes and which also has highly desirable characteristics in the handling of ordinary fluids not considered as corrosive, which is highly satisfactory in use and which establishes complete and effective sealed conditions at all times without necessitating the use of lubricant or stuffing boxes, or physical lifting of the plug in order to effect a change in its setting. The valve structure is simplified and its operation and manipulation made rapid and easy. The valve is also so constructed as to have extended useful life and to be capable of ready replacement of the liner and plug in order to prolong such life.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A lined plug valve of the character described comprising a valve body having a tapered bore therethrough and flow passages opening into said bore, a tapered plug receivable in said bore and having a port therethrough adapted for alignment with said flow passages, the corresponding tapered surfaces of said plug and said bore both being metallic and tapered at small angles within the range of tapers normally causing a gripping and non-rotating action between metallic surfaces, a liner receivable between said surfaces of said plug and said bore and having flow passages matching said flow passages in said body, said liner being formed of plastic material having anti-frictional properties and capable of limited cold flow under pressure substantially in excess of the normal operating pressure and being press fitted by cold flow to have close sealing engagement with said bore and with said plug over substantially the entire inner and outer conical surfaces of said liner, said liner material also having the property of retaining said press fitted sealing engagement with said plug and said bore without cold flow in response to development of said normal pressure through axial pressure on said plug to establish said sealing engagement with said bore and said plug over said substantialy entire inner and outer surfaces of said liner on both sides of said port and flow passages at said normal operating pressures, means for applying a predetermined axial pressure on said liner to retain the same in sealing relation within said body, and means for applying a predetermined axial pressure on said plug towards the small end thereof to maintain said normal pressure sealing engagement of said liner with said bore and said tapered plug surface while allowing for ready turning of said plug in sealing engagement with said liner.

2. A lined plug valve of the character described comprising a valve body having a tapered bore therethrough and flow passages opening into said bore, a tapered plug receivable in said bore and having a port therethrough adapted for alignment with said flow passages, the corresponding tapered surfaces of said plug and said bore both being metallic and tapered at a small angle less than about 4° on a side and within the range normally causing a gripping and non-rotating action between metallic surfaces, a liner receivable between said tapered surfaces of said plug and bore and formed of a plastic material comprising the halogen substitution products of polyethylene characterized by high anti-frictional properties and capability of limited cold flow under pressure substantially in excess of the normal operating pressure range, said liner having flow passages matching said flow passages in said body and also having a flange at its large diameter end fixing the position of said liner axially so that said flow passages will retain accurate alignment, said liner material also having the property of retaining said press fitted sealing engagement with said plug and said bore without cold flow at said normal pressure range to establish said sealing engagement with said bore and said plug over said substantialy entire inner and outer surfaces of said liner on both sides of said flow passages at said normal operating pressures, a cap receivable on said body and enclosing the large diameter end of said plug, means including said cap for applying pressure against said flange to hold said liner in sealing relation with said body, and additional means on said cap maintaining axial pressure on said plug towards the small end thereof to develop said normal pressure to maintain said sealing engagement of said liner with said bore and said tapered plug surface.

3. A lined plug valve of the character described comprising a valve body having a tapered bore extending entirely therethrough and flow passages opening into said bore, a tapered plug receivable in said bore with the smaller end thereof projecting outwardly of said body and having a port therethrough adapted for alignment with said flow passages in said body, the corresponding tapered surfaces of said plug and said bore both being metallic and tapered at small angles within the range of tapers normally causing a gripping and non-rotating action between metallic surfaces, a liner receivable between said surfaces of said plug and said bore and having flow passages matching said flow passages in said body, said liner being formed of plastic material having anti-frictional properties and capable of limited cold flow under pressure substantially in excess of the normal operating pressure range and being press fitted by cold flow to have close sealing engagement with said bore and with said plug over substantially the entire inner and outer conical surfaces of said liner, a sealing diaphragm overlying the larger end of said liner and of said plug, means for applying a predetermined axial pressure on said liner through said diaphragm to retain said liner in sealing relation within said body and with said diaphragm, means for applying a predetermined axial pressure on the larger end of said plug toward the small end thereof through said diaphragm to maintain said normal pressure sealing engagement of said liner with said bore and said tapered plug surface while allowing for ready turning of said plug in sealing engagement with said liner, and means on said projecting end of said plug for effecting turning thereof.

References Cited in the file of this patent

UNITED STATES PATENTS

| 2,102,211 | Nordstrom | Dec. 14, 1937 |
| 2,210,335 | Mueller | Aug. 6, 1940 |
| 2,295,109 | Hamilton | Sept. 8, 1942 |
| 2,394,243 | Joyce | Feb. 5, 1946 |
| 2,424,210 | Sutton | July 15, 1947 |
| 2,525,831 | Scherer | Oct. 17, 1950 |

FOREIGN PATENTS

| 325,814 | France | 1902 |
| 277,614 | Germany | 1913 |
| 17,778 | Great Britain | 1888 |
| 8,661 | Great Britain | 1901 |
| 339,892 | Great Britain | 1930 |

OTHER REFERENCES

"Teflon Makes Its Debut," in Plastics. Pages 32, 34, 97, July 1946 (Ziff-Davis, Chicago).